(12) United States Patent
Andersen

(10) Patent No.: US 7,818,458 B2
(45) Date of Patent: Oct. 19, 2010

(54) CLIPBOARD FOR APPLICATION SHARING

(75) Inventor: Hans C. Andersen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/949,730

(22) Filed: Dec. 3, 2007

(65) Prior Publication Data
US 2009/0144368 A1 Jun. 4, 2009

(51) Int. Cl.
*G06F 15/16* (2006.01)
*G06F 15/167* (2006.01)

(52) U.S. Cl. .................. 709/248; 709/213; 709/214; 709/216

(58) Field of Classification Search .......... 709/248, 709/213, 214, 216
See application file for complete search history.

(56) References Cited

U.S. PATENT DOCUMENTS

| 5,752,254 | A | * | 5/1998 | Sakairi ............... 715/209 |
| 5,923,845 | A | * | 7/1999 | Kamiya et al. ........... 709/206 |
| 5,926,633 | A | * | 7/1999 | Takagi et al. ............ 345/619 |
| 5,964,834 | A | * | 10/1999 | Crutcher ............... 709/213 |
| 6,338,084 | B1 | | 1/2002 | Rankin et al. |
| 6,704,770 | B1 | | 3/2004 | Ramakesavan |

(Continued)

FOREIGN PATENT DOCUMENTS

EP 0597575 A1 5/1994

(Continued)

OTHER PUBLICATIONS

Exhibit A, ActiveXperts, Network Management Solutions & Development Tools: Windows 2000 Resource Kit, copyright 1999-2007, 3 pages.

(Continued)

*Primary Examiner*—Dohm Chankong
*Assistant Examiner*—Hieu Hoang
(74) *Attorney, Agent, or Firm*—Merchant & Gould P.C.

(57) ABSTRACT

A software application can be shared by multiple users. A system clipboard of a first computing system is synchronized with a system clipboard of a second computing system when the user of the second computing system is in control of the shared software application. Information contained in the system clipboard of the first computing system is copied to a state buffer and associated with the user who copied the information. The information is returned to the system clipboard when the associated user regains control of the software application.

10 Claims, 6 Drawing Sheets

U.S. PATENT DOCUMENTS

| | | | |
|---|---|---|---|
| 2002/0085030 A1* | 7/2002 | Ghani | 345/751 |
| 2002/0174241 A1* | 11/2002 | Beged-Dov et al. | 709/230 |
| 2004/0210846 A1* | 10/2004 | Olsen | 715/761 |
| 2005/0015379 A1* | 1/2005 | Aureglia et al. | 707/100 |
| 2005/0066335 A1* | 3/2005 | Aarts | 719/316 |
| 2005/0193143 A1* | 9/2005 | Meyers et al. | 709/238 |
| 2005/0273510 A1* | 12/2005 | Schuh | 709/225 |
| 2006/0155821 A1* | 7/2006 | Pichetti et al. | 709/213 |
| 2006/0211404 A1* | 9/2006 | Cromp et al. | 455/405 |
| 2006/0259923 A1* | 11/2006 | Chiu | 725/24 |
| 2007/0016771 A1* | 1/2007 | Allison et al. | 713/165 |
| 2007/0079249 A1 | 4/2007 | Pall et al. | |
| 2007/0120871 A1* | 5/2007 | Okamoto et al. | 345/619 |
| 2007/0143382 A1* | 6/2007 | Luster | 708/100 |
| 2008/0082932 A1* | 4/2008 | Beumer | 715/770 |
| 2008/0256601 A1* | 10/2008 | Dutta et al. | 726/3 |
| 2008/0282180 A1* | 11/2008 | Glasgow et al. | 715/770 |
| 2009/0000228 A1* | 1/2009 | Valoe et al. | 52/235 |
| 2009/0063683 A1* | 3/2009 | Palin et al. | 709/226 |
| 2009/0100503 A1* | 4/2009 | Doyle | 726/3 |
| 2009/0119246 A1* | 5/2009 | Kansal | 707/2 |
| 2010/0030505 A1* | 2/2010 | Kvavle et al. | 702/85 |

FOREIGN PATENT DOCUMENTS

WO     WO 00/73902     12/2000

OTHER PUBLICATIONS

Exhibit B, Meredith Morris, "Supporting Effective Interaction With Tabletop Groupware", copyright Apr. 2006, including pp. i-ii, viii-xiii, iv-v and 1-5, 8-13, 127-130 (25 total pages).

Exhibit C, Microsoft Corporation, "How To: Securely Copy and Paste Files Between the Terminal Services Client and the Terminal Server in Windows 2000", Nov. 13, 2006, 3 pages.

Network Clipboard and Viewer; http://softplatz.com/Soft/Utilities/Network-Utilities/Network-Clipboard-and-Viewer.html; Aug. 2, 2007, 2 pages.

Synchronizing Clipboards of Multiple Computers by Robert C. Miller and Brad A. Myers; copyright 1999; 2 pages.

TDB: Cascade Clipboards: Accessing Multiple Clipboards; www.delphion.com/tdbs/tdb?o=94A%2060906; Aug. 2, 2007; 1 page.

* cited by examiner

ID
CLIPBOARD FOR APPLICATION SHARING

BACKGROUND

Application sharing technology often involves a host computer and one or more viewing computers. The host computer and viewing computers can communicate across the Internet. The host computer runs a software application that is shared with the viewers. When being shared, the host computer sends data to the viewing computers. The data allows the viewing computers to generate a user interface display similar to that generated by the host computer.

In addition to being able to view the user interface, the viewers are also allowed to control the software application running on the host computer. Control signals are sent from the viewer computer to the host computer, and the host computer responds accordingly. Typically, the host and viewers will take turns controlling the software application. In doing so, users of the host and viewing computers are able to collaboratively work with the software application.

SUMMARY

Embodiments of the present disclosure generally relate to a clipboard for application sharing. In one non-limiting example, the clipboard operates during application sharing to allow multiple users to perform cut, copy, and paste operations.

As discussed herein, an aspect of some embodiments relates to a computing system for application sharing, the computing system comprising a communication device for communicating across a communication network; a processor communicatively connected to the communication device; and memory storing program instructions, which when executed by the processor cause the computing system to provide tools when sharing a software application, the tools comprising a system clipboard for storing information identified by a user and for subsequently providing the information to the software application; a clipboard state buffer for extracting the information from the system clipboard, storing the information, and replacing the information on the system clipboard; and a clipboard synchronizer for synchronizing the system clipboard with a remote system clipboard.

Another aspect of some embodiments relates to a method of copying information during application sharing, the method comprising communicating from a first computing system to a second computing system to share a software application; synchronizing a system clipboard of the first computing system with a system clipboard of the second computing system while the second computing system controls the software application; copying a content of the system clipboard of the first computing system to a state buffer when control of the software application changes from the second computing system to the first computing system; and copying the content from the state buffer to the system clipboard when the second computing system regains control of the software application.

Further aspects relate to a computer readable storage medium, which when executed by a computer performs a method of copying information during application sharing, the method comprising: sharing a software application by communicating data from a first computing system to a second computing system across a communication path; copying information from the system clipboard of the first computing system to a state buffer of the first computing system when control of the software application changes from the first computing system to the second computing system; and copying the information from the state buffer to the system clipboard when control of the software application changes from the second computing system to the first computing system.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
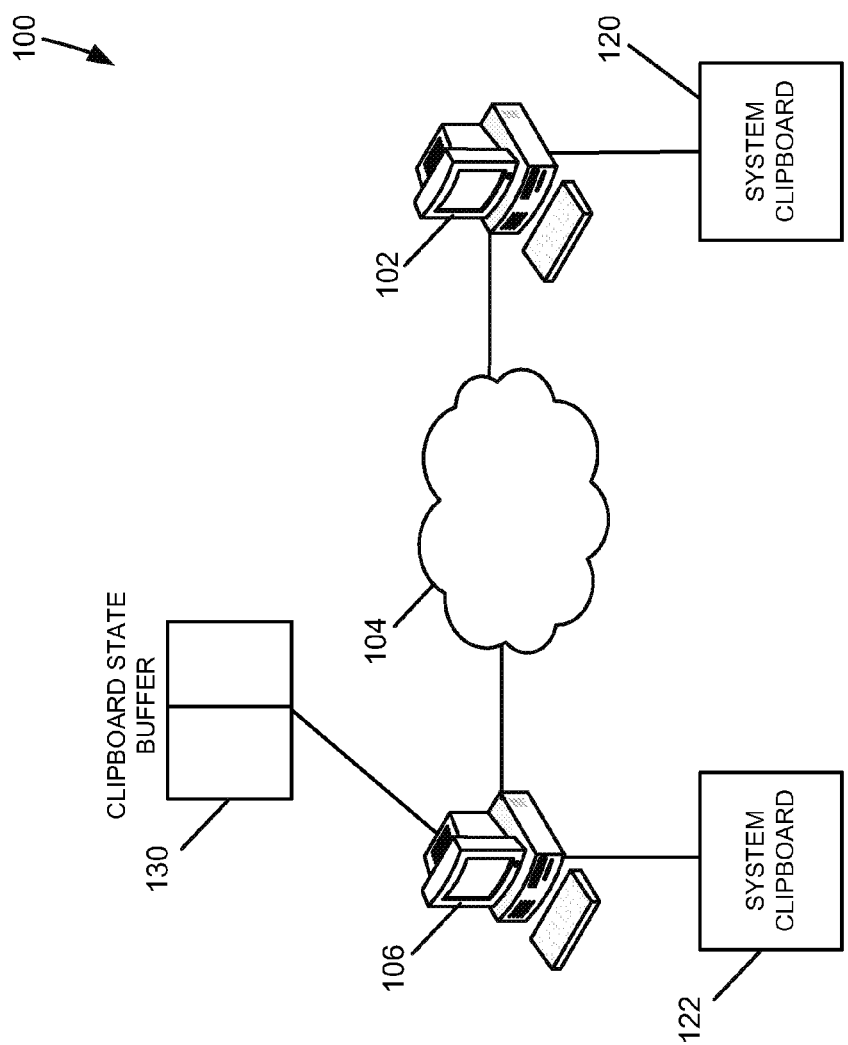
FIG. 1 is a block diagram of an exemplary application sharing system.

This disclosure will now more fully describe exemplary embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to a clipboard for application sharing. In one non-limiting example, the clipboard operates during application sharing to allow multiple users to perform cut, copy, and paste operations.

FIG. 1 is a block diagram of an exemplary application sharing system 100. Application sharing system 100 includes viewer computing system 102, network 104, and host computing system 106. Viewer computing system 102 includes system clipboard 120. Host computing system 106 includes system clipboard 122 and clipboard state buffer 130.

A user (not shown) interacts with viewer computing system 102 to provide inputs through an input device, and to receive outputs from an output device. Viewer computing system 102 typically includes an operating system that provides system clipboard 120 functionality. System clipboard 120 is used in conjunction with various software applications running on viewer computing system 102 to cut, copy, and paste information.

A host user (not shown) interacts with host computing system 106 to provide inputs through an input device, and to receive outputs from an output device. Host computing system 106 typically includes an operating system that provides system clipboard 122 functionality. System clipboard 122 is used in conjunction with various software applications running on host computing system 106 to cut, copy, and paste information.

In addition to system clipboard 122, host computing system 106 includes clipboard state buffer 130. Clipboard state buffer 130 includes memory locations for storing information from system clipboard 120 and system clipboard 122. In some embodiments, state buffer 130 includes memory locations for storing information from additional users, such as another user of host computing system 106, another user of viewer computing system 102, or another user of another viewer computing system (not shown).

In some embodiments, application sharing system 100 operates such that when any user of the application sharing system 100 (e.g., the user of host computing system 106, the user of viewer computing system 102, or the user of another viewer computing system, not shown) performs a paste operation, the information that is pasted is the information that was previously cut or copied by that same user.

Figure 2:
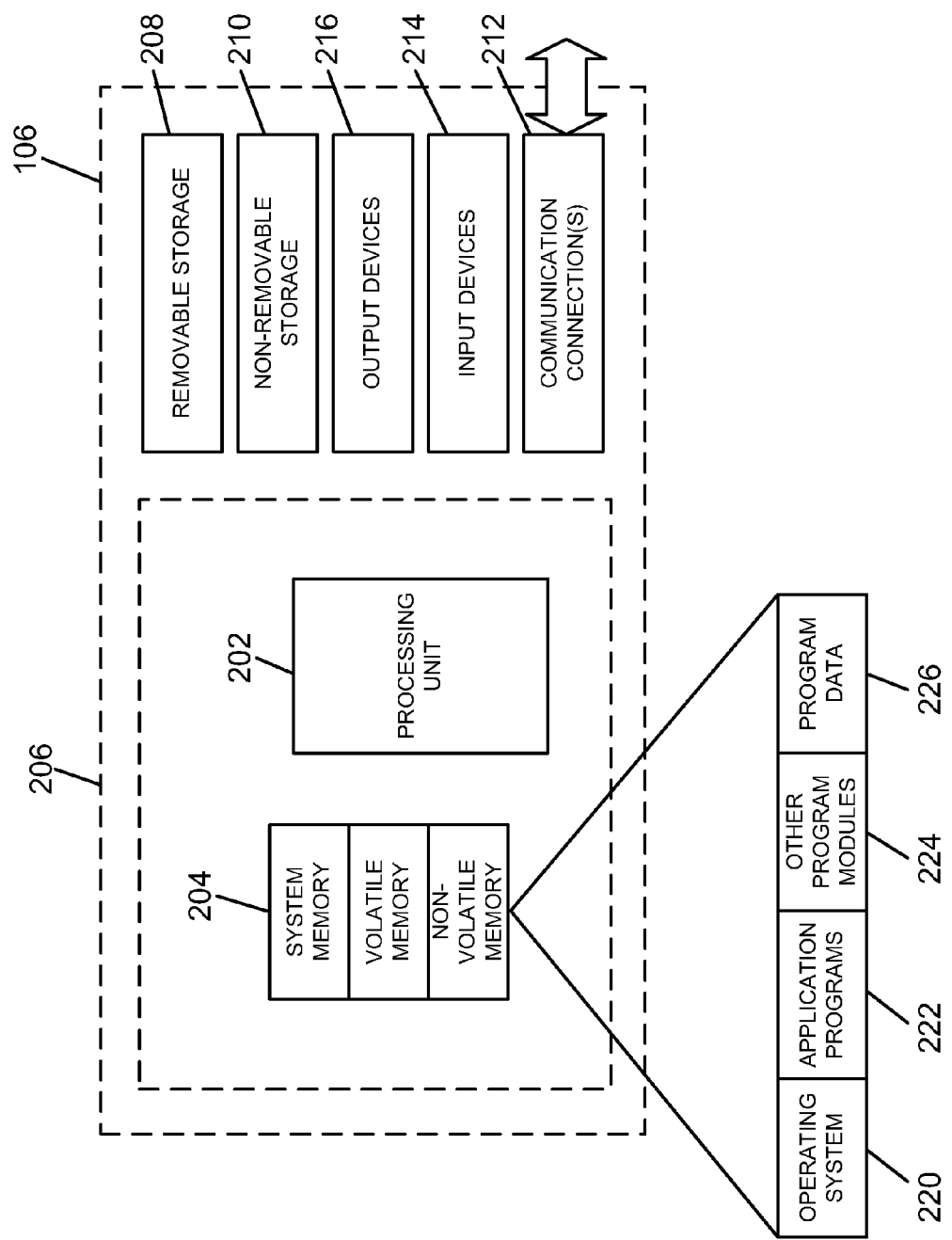
FIG. 2 is a block diagram of an exemplary host computing system of the application sharing system shown in FIG. 1.

FIG. 2 is a block diagram of an exemplary host computing system 106 for implementing aspects of the present disclosure. In some embodiments, viewer computing system 102 is also arranged as shown in FIG. 2. In its most basic configuration, host computing system 106 typically includes at least one processing unit 202 and memory 204. Depending on the exact configuration and type of computing system, memory 204 may be volatile (such as RAM), non-volatile (such as ROM, flash memory, etc.) or some combination of the two. This most basic configuration is illustrated in FIG. 2 by dashed line 206. Additionally, host computing system 106 may also have additional features/functionality. For example, host computing system 106 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by host computing system 106. Any such computer storage media may be part of host computing system 106.

Host computing system 106 may also contain communications connection(s) 212 that allow the computing system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Host computing system 106 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

In some embodiments, memory 204 includes one or more of operating system 220, application programs 222, other program modules 224, and program data 226. Operating system 220 typically includes system clipboard functionality, such as 122, shown in FIG. 1.

In some embodiments, application programs 222 include application sharing software. Application sharing software is a computer program that is responsible for connecting the other computing systems that are participating in the application sharing. The application sharing software provides the mechanisms for connecting to other users, for brokering who is the host computing system and who are the viewer computing systems. Some embodiments of application sharing software display a user interface to allow the user to set up the application sharing in the desired configuration. The application sharing software also transmits information to remote computing systems to enable the remote computing systems to generate an appropriate display to view the shared content. Some application sharing software is a privileged part of the operating system (utilizing, for example, Remote Desktop Protocol or Windows Meeting Space) or a separate piece of add-on software that uses publicly-documented networking, graphics, and user-interface Application Programming Interfaces (APIs). Examples include Live Meeting and SharedView, both distributed by Microsoft Corporation of Redmond, Wash., as well as other application sharing software applications. In some embodiments, the application sharing software exposes various APIs to allow other applications to know when the applications are being shared, who is sharing, who is controlling, and APIs to send messages from the application to a remote participant. For example, the clipboard synchronizer described herein can communicate, in some embodiments, with the application sharing software via APIs.

Figure 3:
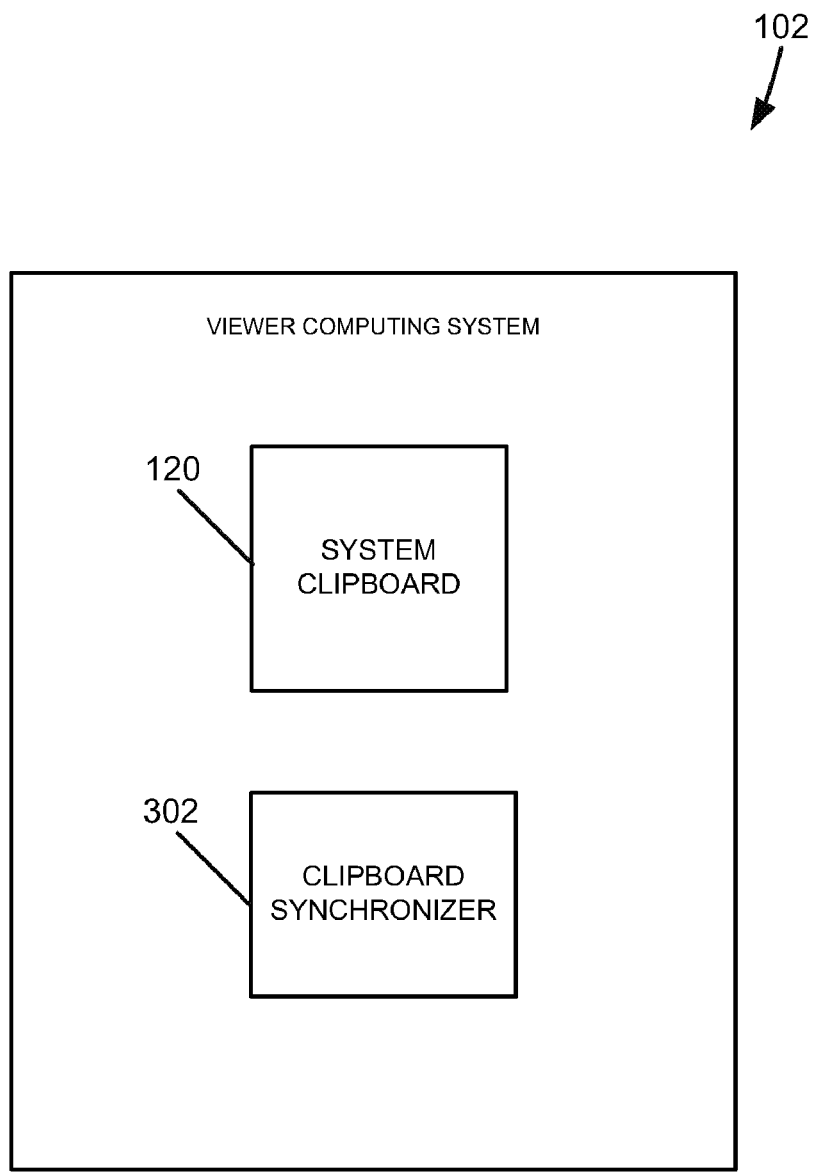
FIG. 3 is a functional block diagram of an exemplary viewer computing system of the application sharing system shown in FIG. 1.

FIG. 3 is a block diagram of an exemplary viewer computing system 102. In addition to possible features shown in FIG. 2, viewer computing system 102 includes system clipboard 120 and clipboard synchronizer 302.

System clipboard 120 allows a user to perform actions such as "copy", "cut", and "paste" such as to conveniently move information within a file or document or between different software applications. In some embodiments, system clipboard 120 includes a special memory resource, typically maintained by the operating system, which stores a copy of information that is cut or copied by the user. A request to perform the copy action is made, for example, by selecting information to be copied (such as by highlighting the information with a pointer) and then selecting "copy" from a menu, or using a keyboard shortcut such as CTRL-C. The operating system then places a copy of the information into memory of system clipboard 120 for later use. A request to perform the "cut" action is made, for example, by selecting information to be cut and then selecting "cut" from a menu, or using a keyboard shortcut such as CTRL-X. Although the operating system also places a copy of the information into memory after the cut action, the cut action differs from the copy action in that the selected information is deleted from the current software application when it is cut.

Once information has been placed into the system clipboard 120, system clipboard 120 makes the information available to be pasted into the same software application or into another software application. To do so, the paste action is used. A request to perform the paste action is typically made by moving a cursor to the location where the information should be pasted, and selecting "paste" from a menu, or using a keyboard shortcut such as CTRL-V. System clipboard 120 saves time in allowing a user to quickly copy information and quickly reproduce that information at another location or in another software application.

As one example, text can be selected from a word processor document, copied into system clipboard 120, and then pasted from system clipboard 120 into another location within the document. Alternatively, the same text can be pasted into a spreadsheet application or into a text field of a Web browser application. An example of system clipboard 120 is the clipboard provided by the WINDOWS® operating system. In some embodiments, various applications can use the clipboard using public system application programming interfaces (APIs). In some embodiments, there is one system clipboard 120 for each signed-in user of computing system 102. In other embodiments there is only a single clipboard for each computing system. Yet other embodiments may include multiple system clipboards per user or per computing system.

In some embodiments, system clipboard 120 is able to store various types of information. A few examples include text, audio, and images. In some possible embodiments, system clipboard 120 can store multiple formats of the same information. For example, information selected from a word processor application can be stored in multiple formats, such as formatted text (such as in rich text format), unformatted text, hypertext markup language (HTML) formatted text, or unformatted unicode text. Other text formats are used in other embodiments. Other information is stored in various other formats.

When information is pasted from system clipboard 120 into a software application, the information is typically inserted to retain as much formatting as supported by the software application. Some software applications include a selection mechanism, such as a "paste special" feature, that allows the user to select between various available formats. In such embodiments, the software application requests from system clipboard 120 a copy of the information in the selected format, and system clipboard 120 provides that information.

Some embodiments of clipboard synchronizer 302 are generally configured to synchronize system clipboard 120 with system clipboard 122 of host computing system 106. For example, clipboard synchronizer, when active, operates to monitor the information stored in system clipboard 120, and to detect when the information changes. When the information changes, the information is sent across network 104 to host computing system 106. A clipboard synchronizer (e.g., 402 shown in FIG. 5) located on host computing system 106 receives the information, and stores the information within the local system clipboard (e.g., clipboard 122). Similarly, clipboard synchronizer 302 also receives information from the clipboard synchronizer (e.g., 402) located on host computing system 106 when information within system clipboard 122 changes, and stores that information in system clipboard 120.

Clipboard synchronizer 302 resides on viewer computing system 102, but in some embodiments remains dormant much of the time. In some embodiments, clipboard synchronizer 302 becomes active when two conditions are met. The first condition is that the host computing system 106 (shown in FIG. 1) is actively sharing a software application with viewer computing system 102. The second condition is that viewer computing system 102 has been granted controller status. When host computing system 106 and viewer computing system 102 are sharing an application, control can pass back and forth between the computing systems 102 and 106. Clipboard synchronizer 302 is activated when viewer computing system 102 is in control. Controller status can be given to viewer computing system 102 in various ways. For example, the user of host computing system 106 provides an input (such as by selecting a button from a user interface) to pass control to viewer computing system 102. As another example, the user can request control by providing an input. Control is passed automatically in some embodiments when input is provided by either user, such as by moving the mouse pointer or entering data into the keyboard. When both conditions are met, clipboard synchronizer 302 operates in conjunction with clipboard synchronizer 402 to synchronize system clipboards 120 and 122.

Some possible embodiments operate clipboard synchronizer 302 such that it does not communicate information from the system clipboard of viewer computing system 102 to host computing system 106 until the user of viewer computing system 102 actually begins to remote control the software application. This saves bandwidth in reducing unnecessary communication of clipboard information, and improves security and privacy by maintaining information until the viewer actually begins to control the application.

In some embodiments, clipboard synchronizer 302 communicates information as in binary form. When a change to system clipboard 120 is detected, clipboard synchronizer 302 obtains the information from the clipboard, packages the information (such as by using a compression algorithm) and transmits across network 104. For example, public APIs are used by the clipboard synchronizer 302 to extract the information, often including multiple formats. In some embodiments, the packaged information is arranged in a binary form and includes a header identifying the content followed by sets of bytes. Each set of bytes includes a binary form of one format of the information. In some embodiments, the packaged information does not include all available formats, but only those that can be readily interpreted by all parties, such as Unicode text, device independent bitmaps, enhanced metafiles, comma-separated value format, HTML format, and rich text format. In some embodiments, the header defines a table including the location of each set of bytes within the package (e.g., an offset), and the content of each set. The information is compressed and encrypted if desired. Because the various forms often include much of the same information, compression can greatly reduce the size of the package, thereby increasing transmission speed and reducing communication bandwidth requirements.

Figure 4:
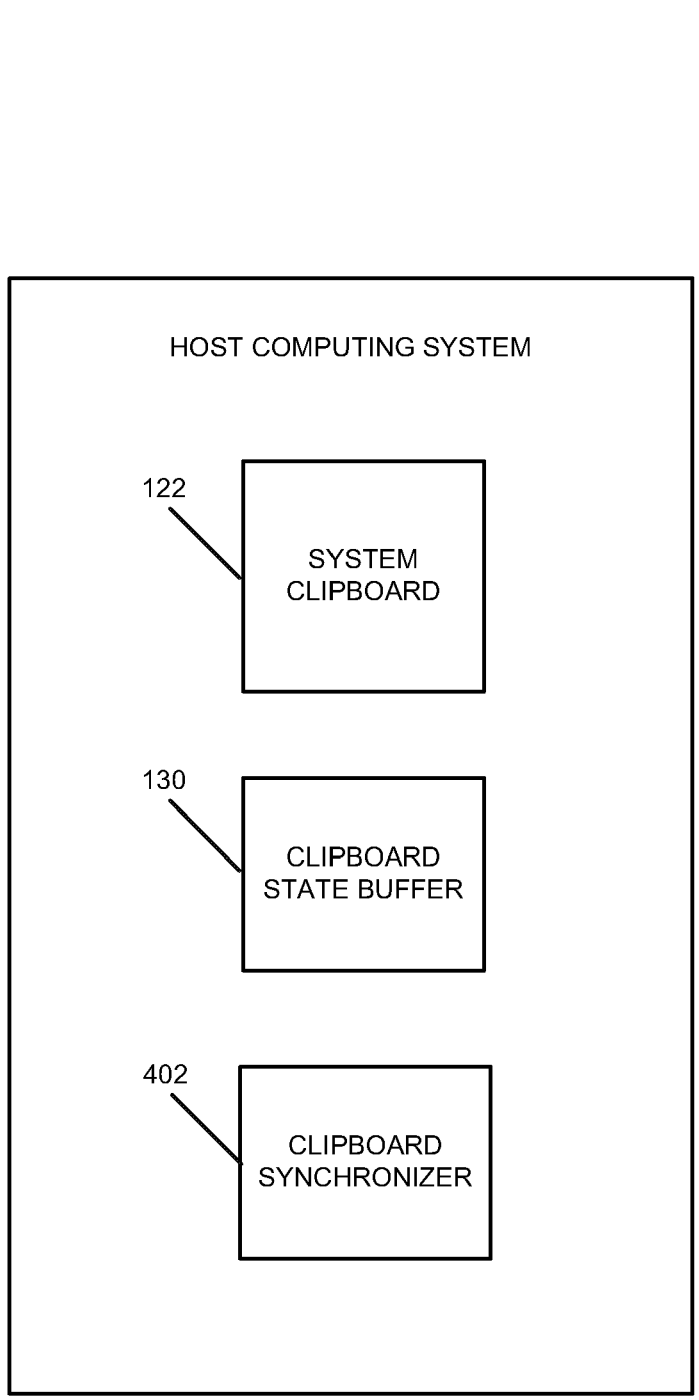
FIG. 4 is a functional block diagram of the host computing system shown in FIG. 2.

FIG. 4 is a block diagram of an exemplary host computing system 106. In addition to other possible features (such as those shown in FIG. 2), host computing system 106 includes system clipboard 122, clipboard state buffer 130, and clipboard synchronizer 402.

System clipboard 122 allows a user of host computing system 106 to perform actions such as "cut", "copy", and "paste" to easily move information around within a software application or to another software application. An example of system clipboard 122 is the clipboard provided by the WINDOWS® operating system. In some embodiments, various applications can use the clipboard using public system application programming interfaces (APIs). In possible embodiments, there is one system clipboard 122 for each signed-in user of computing system 106. When information is cut or copied by the user of host computing system 106, a copy of the information is stored in memory of system clipboard 122.

In addition to system clipboard 122, host computing system 106 also includes clipboard state buffer 130. Clipboard state buffer 130 includes memory for storing a copy of information from system clipboard 122. In some embodiments, the information is packaged in a binary form. In some embodiments, a user identifier (ID) is stored with the information, such that the clipboard state buffer 130 can associate the information with a particular user. Typically, clipboard state buffer 130 is arranged to store information associated with at least two user IDs, including a user of host computing system 106 and at least one viewer computing system 102. In other embodiments, multiple viewer computing systems 102 are utilized, in which case clipboard state buffer 130 stores information associated with the additional users of these computing systems as well.

Application sharing typically begins with host computing system 106 being designated at the initial controller. During this period, a copy of information that is cut or copied, if any, is stored in system clipboard 122. The information can subsequently be pasted upon receipt of an input from the user of host computing system 106, by passing the information from system clipboard 122 to the desired software application.

When control is passed from host computing system 106 to viewer computing system 102, inputs provided by the user of viewer computing system 102 are received by viewer computing system 102 and transmitted across network 104 to host computing system 106. Host computing system 106 receives the inputs and passes the input to the software application in such a way (e.g., using public APIs) that the software application thinks the input is being provided by the user of host computing system 106. As a result, it is beneficial to change the status of system clipboard 122 when control is passed, to prevent the user of viewer computing system 102 from being able to paste information previously cut or copied by the user of host computing system 106. It is also beneficial to place information into system clipboard 122 that is associated with the user who is now taking control, as described in more detail below.

Clipboard state buffer 130 is used to maintain copies of information from system clipboard 122 when control is changed from one user to another user. For example, when control is passed from the user of host computing system 106 to the user of viewer computing system 102, clipboard state buffer 130 copies the information from system clipboard 122 and stores it in clipboard state buffer 130. In some embodiments, copying of the information involves serializing the information, and optionally compressing and/or encrypting the information to package the information. In addition, an identifier of the user of host computing system 106 is stored in clipboard state buffer 130 to associate the information with the appropriate user. Clipboard state buffer 130 then clears system clipboard 122 to prevent the user of viewer computing system 102 from pasting another user's cut or copied information.

When control is passed to viewer computing system 102, clipboard state buffer 130 checks to see whether any information stored in clipboard state buffer 130 is associated with the user ID (or other identifier) of viewer computing system 102. If not, no action is taken. If so, the information associated with the user ID is copied from clipboard state buffer 130 into system clipboard 122. In some embodiments, copying of the information involves uncompressing and/or decrypting the information. Also, in some embodiments information is deserialized, to extract the information of various formats and store the information in system clipboard 122 according to the respective format. The clipboard synchronizers of the host and viewer computing systems compare the information of system clipboard 122 to determine whether the user has subsequently placed information into system clipboard 120 before regaining control of the shared application. If so, the information of system clipboard 122 is overwritten by the information of system clipboard 120. One of the benefits of storing information for viewer computing systems in clipboard state buffer 130 is that the data does not have to be retransmitted from viewer computing system 102 to host computing system 106 each time that control is passed to the user of viewer computing system 102.

When control is passed from the user of viewer computing system 102 to another user (such as a user of either a viewer computing system 102 or host computing system 106), the same procedure is followed. Clipboard state buffer 130 is updated to store a copy of system clipboard 122 associated with the user that was previously in control. Clipboard state buffer 130 then determines whether it contains information associated with the user ID of the new controlling user. If so, the information is copied from clipboard state buffer 130 to system clipboard 122.

Figure 5:
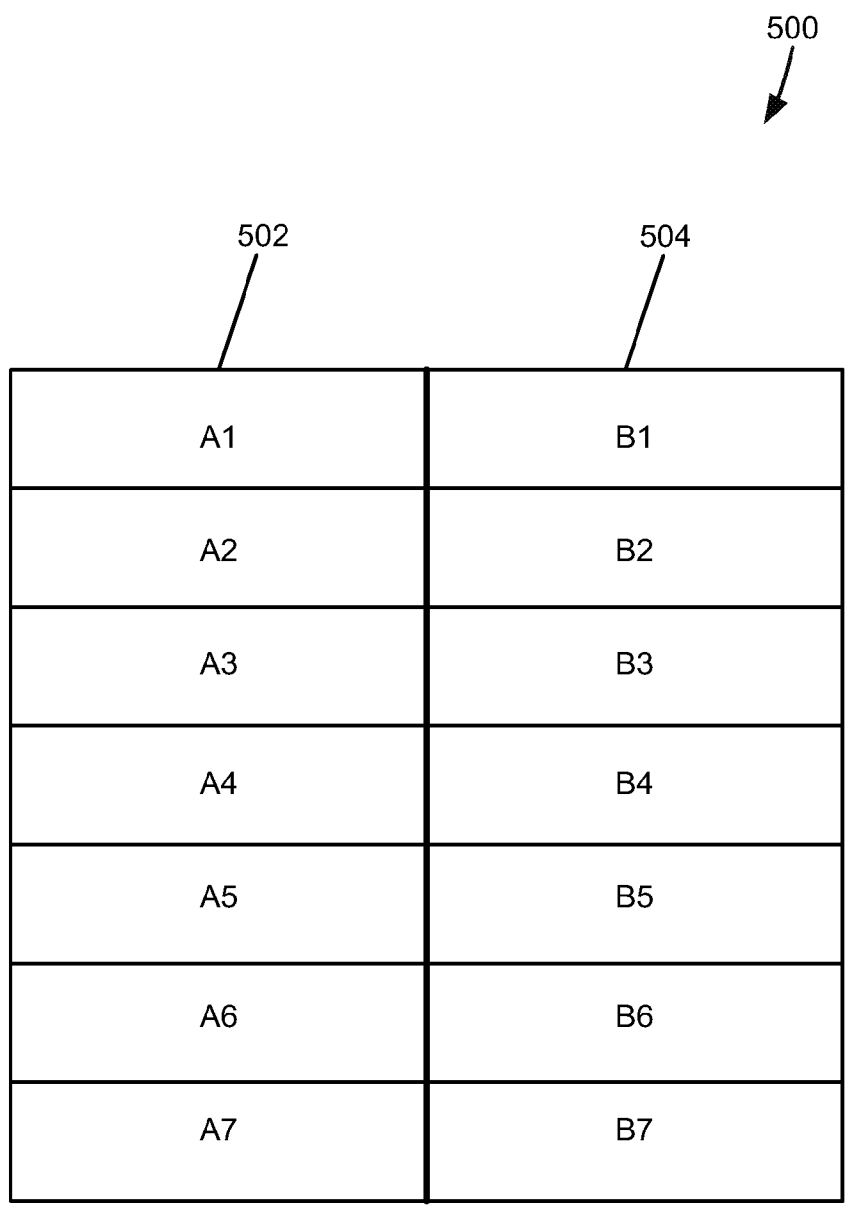
FIG. 5 is a block diagram of an exemplary memory structure of a clipboard state buffer of the host computing system shown in FIG. 4.

FIG. 5 is a block diagram of an example memory structure 500 of clipboard state buffer 130. Memory structure 500 includes a first portion 502 and a second portion 504. The first portion 502 is associated with a first user, such as the user of host computing system 106. The second portion 504 is associated with a second user, such as the user of viewer computing system 102. In some embodiments, first and second portions 502 and 504 are memory for storing packaged information associated with the respective user. In other embodiments, memory structure 500 includes more than two portions, such that memory structure 500 stores information associated with additional users.

First and second portions 502 and 504 store information copied from the system clipboard of host computing system 106. In some possible embodiments, the information from the system clipboard is available in multiple formats. For example, first portion 502 includes information A, stored in various formats including A1-A7. Similarly, second portion 504 includes information B, stored in various formats B1-B7. More or less formats are used in other embodiments. In some embodiments, the information stored within first and second portions 502 and 504 is serialized. Also, in some embodiments the information is encrypted and/or compressed. The information can be deserialized, unencrypted, and uncompressed if necessary prior to moving the information back onto the system clipboard.

Figure 6:
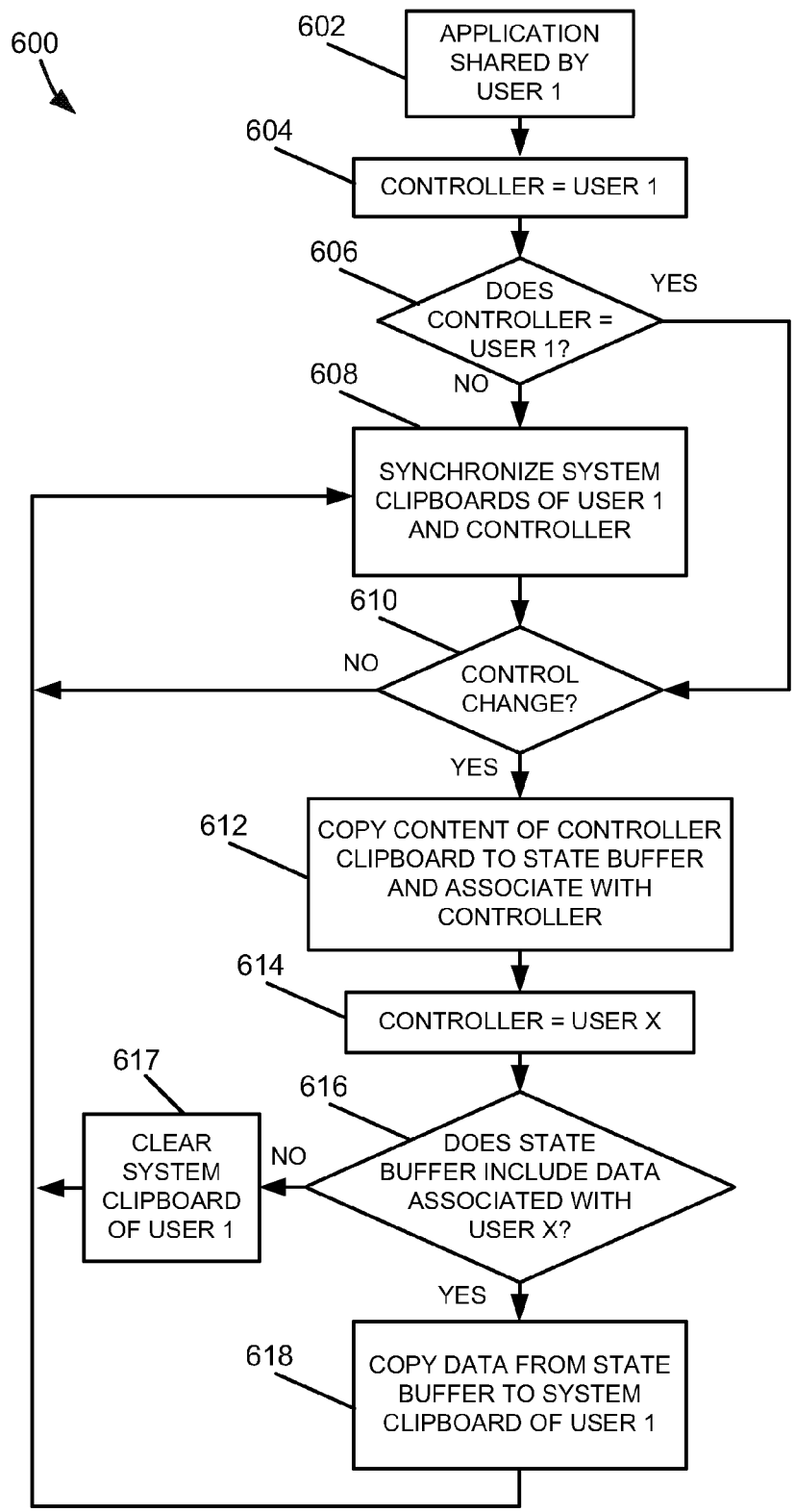
FIG. 6 is a flow chart illustrating an exemplary method according to the present disclosure.

FIG. 6 is a flow chart illustrating an exemplary method 600. Method 600 begins with operation 602 when an application is shared by a first user (user 1). As represented by operation 604, the first user is typically set as the controller by default until control is passed to another user.

Operation 606 is performed to determine whether the current controller is the first user or another user. If the controller is a user other than the first user, operation 608 is performed to synchronize the system clipboard of the current controller with the system clipboard of the first user. In some embodiments this is accomplished by clipboard synchronizers operating on the computing systems of the users. The clipboard synchronizers monitor the system clipboard for changes, and if a change occurs, the content of the clipboard is sent to the system clipboard of the other user. In this way, the content of the system clipboards are synchronized, such that they both contain the same information. If, during operation 606, it is determined that the controller is the first user, then operation 610 is performed.

Following operations 606 or 608, operation 610 is performed to determine whether a control change is being made. If not, method 600 continues to synchronize the system clipboards in operation 608 if the controller is not equal to the first user in operation 606. If a control change is occurring, operation 612 is performed to copy the content of the system clipboard of the first user to the state buffer, and to associate that content with the controller (i.e. the user that is now giving up control). Operation 615 is performed to change control to the next controller, referred to as user x. User x can be any user including the first user, or any other user that is sharing the application shared in operation 602.

Operation 616 is then performed to determine whether the state buffer contains data that has been previously stored and associated with user x. If not, the system clipboard of user 1 is cleared in operation 617, and method 600 returns to operation 606. If the state buffer does contain data associated with user x, operation 618 is performed to copy the data associated with user x from the state buffer and into the system clipboard for the first user.

Method 600 continues in this manner until application sharing is terminated. Method 600 results in clipboard functionality that allows a user to perform a cut or copy operation either on the user's own computing system or remotely on another computing system and to have the result of a subsequent paste operation contain the data previously cut or copied, and not data that someone else previously cut or copied. As a result, some embodiments make the clipboard easy to use and intuitive. Some embodiments also improve security and confidentiality by preventing the inadvertent pasting of data cut or copied by another user. Some embodiments can be implemented in such a way that the software application being shared does not itself require changes or customization, such that preexisting software applications can benefit from the method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for application sharing, the computing system comprising:
    a communication device for communicating across a communication network;
    a processor communicatively connected to the communication device; and
    memory storing program instructions, which when executed by the processor cause the computing system to provide tools when sharing a software application, the instructions causing the identification of a controller, the controller being a single computing system that is currently configured to receive input from a user to control the shared software application, the tools comprising:
        a system clipboard for storing information identified by a user and for subsequently providing the information to the software application;
        a clipboard state buffer for transferring the information from the system clipboard when control of the shared software application changes from the computing system to a remote computing system, storing the information, and replacing the information on the system clipboard when control of the shared software application changes from the remote computing system to the computing system; and
        a clipboard synchronizer for synchronizing the system clipboard with a remote system clipboard when the remote computing system is controlling.

2. The computing system of claim 1, wherein storing the information comprises associating the information with the first user.

3. The computing system of claim 2, wherein before replacing the information on the system clipboard, the clipboard state buffer locates the stored information associated with the first user.

4. The computing system of claim 3, wherein the clipboard synchronizer synchronizes the system clipboard with a remote system clipboard when a second user is in control of the software application through the remote computing system.

5. The computing system of claim 4, wherein the clipboard synchronizer monitors the system clipboard for a change, and when the change occurs, copies information from the system clipboard and sends it to the remote computing system to synchronize the remote system clipboard.

6. A computer readable storage medium storing computer executable instructions, which when executed by a computer perform a method of copying information, the method comprising:
    sharing a software application operating on a first computing system by communicating data from the first computing system to a second computing system across a communication path, wherein the instructions cause the identification of a controller, the controller being a single computing system that is currently configured to receive input from a user to control the shared software application;
    when control of the shared software application changes from the first computing system to the second computing system, transferring contents of the system clipboard of the first computing system to a state buffer of the first computing system;
    while the second computing system is controlling, synchronizing contents of the system clipboard of the second computing system with contents of the system clipboard of the first computing system, wherein the contents of the system clipboard of the second computing system are available in the system clipboard of the first computing system for a paste operation into the shared software application; and
    when control of the shared software application changes from the second computing system to the first computing system, transferring contents of the state buffer to the system clipboard of the first computing system, wherein contents of the system clipboard of the first computing system are available for a paste operation into the shared software application while the first computing system is controlling.

7. The computer readable storage medium of claim 6, wherein the method further comprises:
    storing an identifier of a user of the first computing system in the state buffer to associate the information with the user; and
    determining whether the state buffer contains information associated with the user before copying the information from the state buffer to the system clipboard.

8. The computer readable storage medium of claim 6, wherein the method further comprises:
    receiving an input from the user identifying the information;

receiving a second input from a user requesting that an action be performed with the information, the action being one of a copy action or a paste action; and storing a copy of the information into the system clipboard after receiving the second input and before copying the information from the system clipboard.

9. The computer readable storage medium of claim 6, wherein the method further comprises:

receiving a third input from the user requesting a paste action be performed with the information; and copying the information from the system clipboard to the software application after receiving the third input and after copying the information from the state buffer to the system clipboard.

10. The computer readable storage medium of claim 6, wherein the method further comprises sharing the software application by communicating data from the computing system to a third computing system.

* * * * *